(12) United States Patent
Hayashi et al.

(10) Patent No.: US 6,637,977 B2
(45) Date of Patent: Oct. 28, 2003

(54) COMPRESSED GAS STORAGE TANK UTILIZING ROCK-BED CAVITY

(75) Inventors: Masao Hayashi, Abiko (JP); Hiroyuki Nishimura, Tokyo (JP)

(73) Assignees: Masao Hayashi, Chiba (JP); Asahi Engineering Co., Ltd., Kanagawa (JP)

( * ) Notice: Subject to any disclaimer, the term of this patent is extended or adjusted under 35 U.S.C. 154(b) by 0 days.

(21) Appl. No.: 10/168,977

(22) PCT Filed: Dec. 27, 2000

(86) PCT No.: PCT/JP00/09322
§ 371 (c)(1), (2), (4) Date: Jun. 26, 2002

(87) PCT Pub. No.: WO01/48325
PCT Pub. Date: Jul. 5, 2001

(65) Prior Publication Data
US 2003/0021631 A1 Jan. 30, 2003

(30) Foreign Application Priority Data
Dec. 28, 1999 (JP) ............ 11/373171

(51) Int. Cl.⁷ ............................. B65G 5/00
(52) U.S. Cl. ............................. 405/59; 405/53
(58) Field of Search ............... 405/52, 53, 55, 405/57, 59

(56) References Cited

U.S. PATENT DOCUMENTS

| | | | | |
|---|---|---|---|---|
| 3,866,058 A | * | 2/1975 | Lenssen | 405/59 X |
| 3,996,741 A | * | 12/1976 | Herberg | 405/53 X |
| 4,355,923 A | * | 10/1982 | Schwarzenbach | 405/59 |
| 4,392,354 A | * | 7/1983 | Schwarzenbach | 405/59 X |
| 4,538,414 A | * | 9/1985 | Saleh | 405/53 X |

FOREIGN PATENT DOCUMENTS

| | | |
|---|---|---|
| JP | A 9-154244 | 6/1997 |
| JP | 9-287156 | 11/1997 |
| JP | A 10-156356 | 6/1998 |
| JP | A 11-153082 | 6/1999 |
| JP | 2000-27583 | * 1/2000 |

* cited by examiner

Primary Examiner—Heather Shackelford
Assistant Examiner—Sunil Singh
(74) Attorney, Agent, or Firm—Young & Thompson

(57) ABSTRACT

A compressed gas storage tank 10 utilizes a rock-bed cavity 11 in which a bentonite slurry is fed into an underground cavity 11 formed in a rock-bed, a forcibly fed compressed gas is stored in the rock-bed cavity in a state in which the compressed gas is loaded with a pressure load of the bentonite slurry from the underside of the compressed gas, the bentonite slurry in the rock-bed cavity 11 is of a dual layer structure consisting of an upper layer composed of a light bentonite slurry 30 mixed with a filling-up material invading into and filling up a void and a crack formed in an inner wall surface of the rock-bed cavity and a lower layer composed of a heavy bentonite slurry 13 mixed with a high specific gravity fine powder as a load condition material. The filling-up effect of the bentonite slurry secures sufficient liquid-tightness and air-tightness in the ceiling part of the rock-bed cavity, making it possible to efficiently and economically store compressed gases such as compressed air or natural gas without allowing them to escape.

4 Claims, 4 Drawing Sheets

COMPRESSED GAS STORAGE TANK UTILIZING ROCK-BED CAVITY

TECHNICAL FIELD

The present invention relates to a compressed gas storage tank utilizing a rock-bed cavity, in which a bentonite slurry (drilling mud or clay base mud) is fed into an underground cavity formed in a rock-bed, and compressed gasses such as air or natural gas, which have been forcibly fed into the underground cavity through a compressed gas pipe, is stored in the rock-bed cavity in a state in which the compressed gas is loaded with a pressure load of the bentonite slurry from the underside of the compressed gas.

BACKGROUND ART

For example, a compressed air storage tank (CAES) used for a compressed air storage/gas turbine power generation is constituted such that a compressed air is stored in a closed space formed in the underground.

It is, in general, difficult to construct or to install a tank for storing a compressed gas such as a compressed air or natural gas considerably deep in the underground. In view of the foregoing, compressed gas storing tanks are proposed, for example, by Japanese Patent Application Laid-Open Nos. 09-154244 and 11-153082, in which an underground cavity or a abandoned mine formed in a rock-bed, such as a self-sustaining hard rock, by means of excavation operation is utilized as it is.

On the other hand, in a tank utilizing such a rock-bed cavity, since a compressed gas tends to leak through a crack or the like formed in a rock-bed at the time of storing the compressed gas, its air-tightness needs to be improved. As a method for increasing the air-tightness of the rock-bed cavity, there can be contemplated a method for forming a concrete layer over an inner wall surface of a rock-bed cavity, a method for adhering a rubber sheet, a method for employing a water sealing tunnel, or a method in which a bentonite slurry is fed into a rock-bed cavity and a mud cake is formed on an inner wall surface by muddy component such as bentonite contained in the bentonite slurry so that a void and a crack formed in the rock-bed is blocked with this mud cake.

According to this compressed air storage tank mentioned above, a working fluid composed of a bentonite slurry and the like is supplied into an air storage chamber from the underside thereof, which chamber is a closed space for storing a compressed air, for example through a connected passageway between the air storage chamber and a storage reservoir provided at an upper location of the air storage chamber, and the working fluid is flowed between the air storage chamber and the storage reservoir in accordance with a storing quantity of the compressed air, so that the compressed air is stored in a state in which the compressed air is loaded with a hydrostatic pressure of the working fluid from the underside thereof. During night time when a compressed air is fed and stored utilizing surplus electric power, the working fluid is moved to the storage reservoir as the storing quantity of the compressed air is increased. During day time when the compressed air is used for power generation, the working fluid is moved to the air storage chamber as the storing quantity of the compressed air is reduced.

However, the conventional method for increasing the air-tightness of the rock-bed cavity utilizing a bentonite slurry has shortcomings in that air and gas tend to remain particularly at the top end part of the rock-bed cavity at the time of filling a bentonite slurry and a stable mud cake is difficult to make, thus making it unable to fully block the void and crack in some cases. Moreover, self-maintenance of air-tightness, which is performed, for example, during operation of the compressed gas storage tank, by repeatedly creating a fluid tight state utilizing a bentonite slurry and an air-tight state utilizing a compressed gas is not sufficiently performed in some cases, particularly at the top end part of the rock-bed cavity where the compressed gas tends to remain.

DISCLOSURE OF THE INVENTION

The present invention has been made by paying attention to such conventional problems as just mentioned above. It is, therefore, an object of the present invention to provide a compressed gas storage tank utilizing a rock-bed cavity in which a top end part of a rock-bed cavity is surely blocked to realize a sufficient air-tightness, and in which self-maintenance of air-tightness, which is performed by repeatedly creating a fluid tight state and an air-tight state, can surely be performed at the top end part of the rock-bed cavity, and therefore a compressed gas can be stored in a stable condition without allowing escape of the compressed gas.

The present invention has achieved the above object by providing a compressed gas storage tank utilizing a rock-bed cavity in which a bentonite slurry is fed into an underground cavity formed in a rock-bed, and a compressed gas forcibly fed to the underground cavity through a compressed gas pipe is stored in the rock-bed cavity in a state in which the compressed gas is loaded with a pressure load of the bentonite slurry from the underside of the compressed gas, wherein the compressed gas pipe is open downward from a top portion of the rock-bed cavity, and the bentonite slurry in the rock-bed cavity is of a dual layer structure consisting of an upper layer composed of a light bentonite slurry mixed with a filling-up material (for example, a lost circulation inhibitor) invading into and filling up a void and a crack formed in an inner wall surface of the rock-bed cavity and having a specific gravity of 1.05 to 1.20, and a lower layer composed of a heavy bentonite slurry mixed with a high specific gravity fine powder as a load control material and having a specific gravity of 1.20 to 2.0 (the invention as defined in claim 1).

Moreover, according to the compressed gas storage tank of the present invention, it is preferred that the light bentonite slurry is forcibly fed through the compressed gas pipe into the rock-bed cavity in which the bentonite slurry is filled (the invention as defined in claim 2).

Furthermore, according to the compressed gas storage tank of the present invention, it is also preferred that the rock-bed cavity is an underground cavity extending laterally with its ceiling part exhibiting a rising gradient toward the top part which is a connecting portion with the compressed gas pipe (the invention as defined in claim 3).

Moreover, according to the compressed gas storage tank of the present invention, it is also preferred that the heavy bentonite slurry is fed into the rock-bed cavity through a vertical shaft formed in the underground and the vertical shaft has associated facilities such as a reverse osmosis membrane water-generating pipe and a deep aeration pipe juxtaposed thereto (the invention as defined in claim 4).

The above-mentioned light bentonite slurry is a muddy water having a specific gravity of 1.05 to 1.20 obtained by adding, for example, a powder of calcium carbonate having an average grain diameter of about 10 to 20 microns, as a filler, to a bentonite slurry. This light bentonite slurry is mixed with, for example, a lost circulation inhibitor (LCM) as a filling-up material serving as a core at the time of formation of a mud cake for blocking a void and a crack formed in a rock-bed. Owing to the presence of the filler and the filling-up material, the mud cake is surely and firmly formed at the void and the crack of the rock-bed, thereby ensuring a stable air-tightness.

The above-mentioned heavy bentonite slurry is a suspension obtained by mixing, for example, a bentonite slurry with a high specific gravity fine powder such as barite and hematite as a load adjusting material in such a stable condition that it may hardly precipitate. The heavy bentonite slurry is a muddy water having a specific gravity of about 1.2 to 2.0. Owing to the heavy bentonite slurry having a high specific gravity, the bentonite slurry in the rock-bed can surely be held in a dual structure having a light bentonite slurry as an upper layer, and a mud cake can smoothly be formed at the top end part of the rock-bed cavity, which is a weak part where the void and the crack are hardly blocked up, by closely contacting the light bentonite slurry with the top end part easily.

It is preferred that in order not to lose activity by maintaining a stable state for a long period of time, the bentonite slurry is added with a dispersing agent such as phosphate, lignite, styrensulfonic acid/maleic anhydride copolymer and polyacrylic acid in accordance with necessity.

The light bentonite slurry is, in general, inexpensive compared with the heavy bentonite slurry which is expensive. Therefore, due to the dual structure in which the upper layer of the heavy bentonite slurry is replaced with light bentonite slurry, economic efficiency can be obtained by reducing the quantity of use of the heavy bentonite slurry. In addition, economical maintenance management can be obtained by supplementing the reduced quantity of the bentonite slurry in the rock-bed cavity with the inexpensive light bentonite slurry.

Moreover, according to the compressed gas storage tank of the present invention, since the compressed gas pipe for feeding a compressed gas is open downward from the top part of the rock-bed cavity, the bentonite slurry can fully be filled in the cavity of the rock-bed while completely allowing air and the like to escape from the cavity of the rock-bed, and in addition, the void and the crack of the top end part of the rock-bed cavity, at which part the stored gas tends to escape, can surely and economically be blocked by closely contacting the inexpensive light bentonite slurry mixed with a filling-up material with the top end part of the rock-bed cavity.

In the case where the light bentonite slurry is forcibly fed into the rock-bed cavity, in which the bentonite slurry is filled, through the compressed gas pipe, the light bentonite slurry is fed into the rock-bed cavity from the top part to the ceiling part of the rock-bed cavity with pressure applied thereto while pushing out the bentonite slurry already filled therein and therefore, blocking of the void and the crack formed in the rock-bed is enhanced by efficiently entering the light bentonite slurry into the void and the crack with the pressure to form the mud cake. Even if the light bentonite slurry is reduced by being infiltrated into the rock-bed, the function for blocking the void and the crack can be maintained continuously and economically by supplementing the inexpensive light bentonite slurry through the compressed gas pipe easily.

Moreover, according to the compressed gas storage tank of the present invention, in the case where the vertical shaft has associated facilities such as a reverse osmosis membrane water-generating pipe and a deep aeration pipe juxtaposed thereto, economic efficiency can be obtained by effectively utilizing the vertical shaft formed by excavating the underground deep into the rock-bed cavity.

BEST MODE FOR CARRYING OUT THE INVENTION

Figure 1:
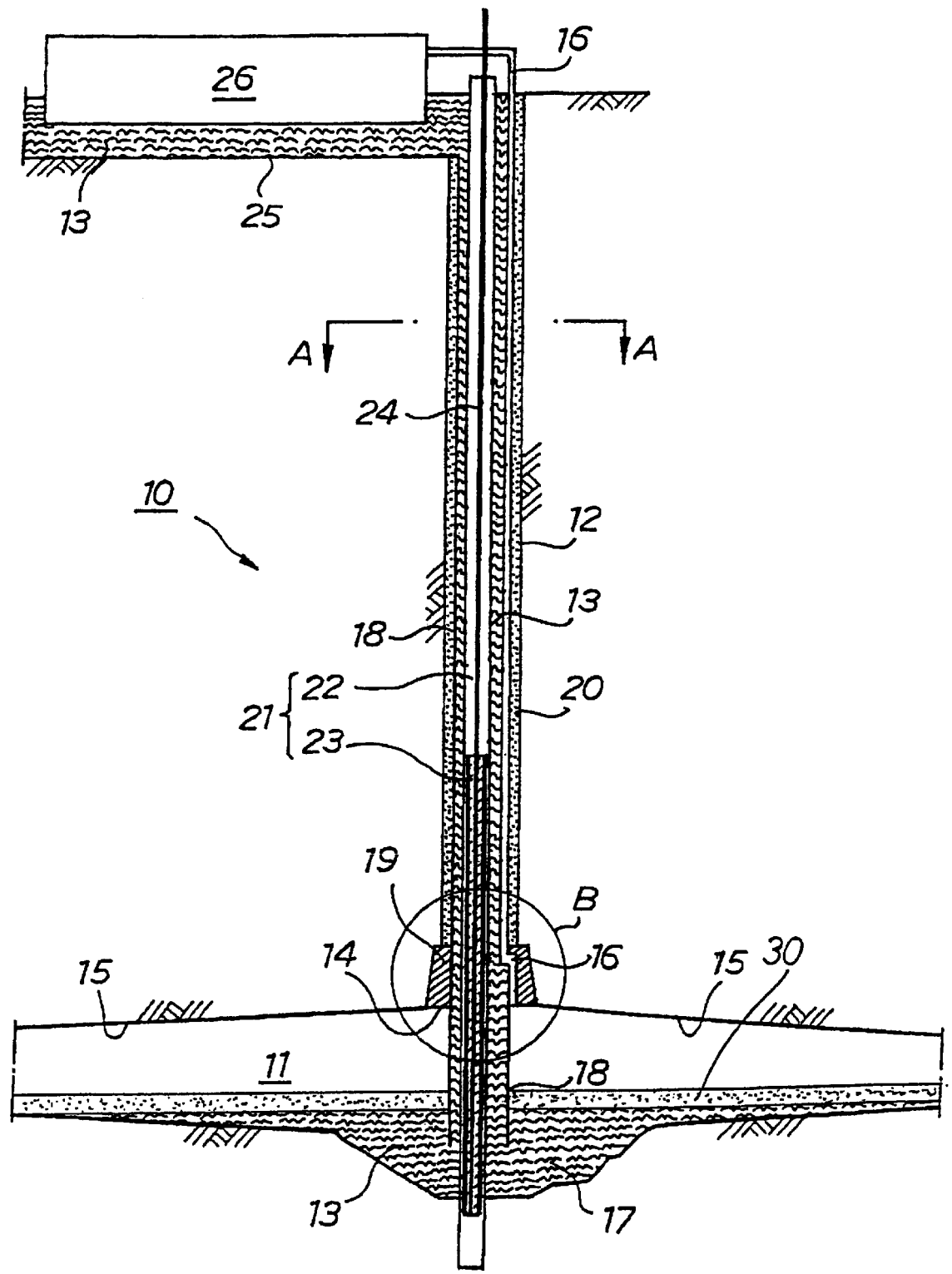
FIG. 1 is a schematic sectional view showing a state of storage of a compressed air in a compressed gas storage tank according to one embodiment of the present invention.
Figure 2:
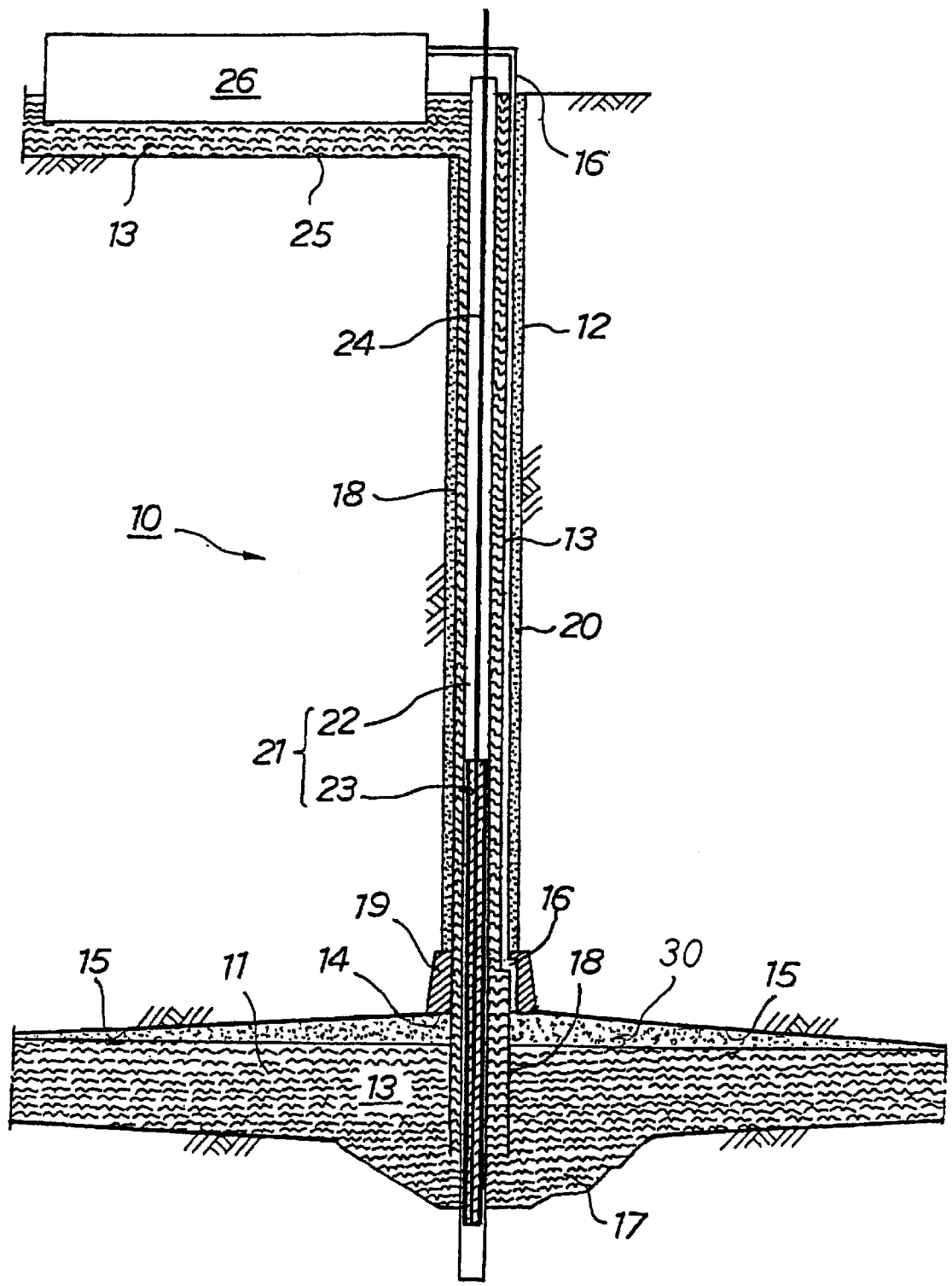
FIG. 2 is a schematic sectional view showing a state in which a compressed air is removed and a bentonite slurry is filled in the compressed gas storage tank according to one embodiment of the present invention.
Figure 3:
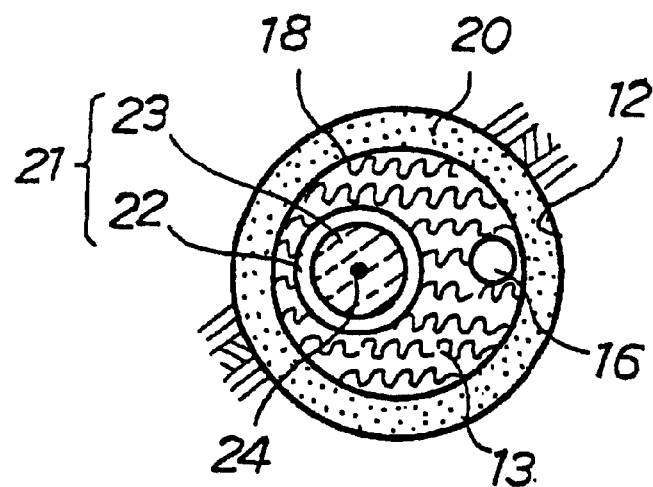
FIG. 3 is a sectional view taken on line A—A of FIG. 1.
Figure 4:
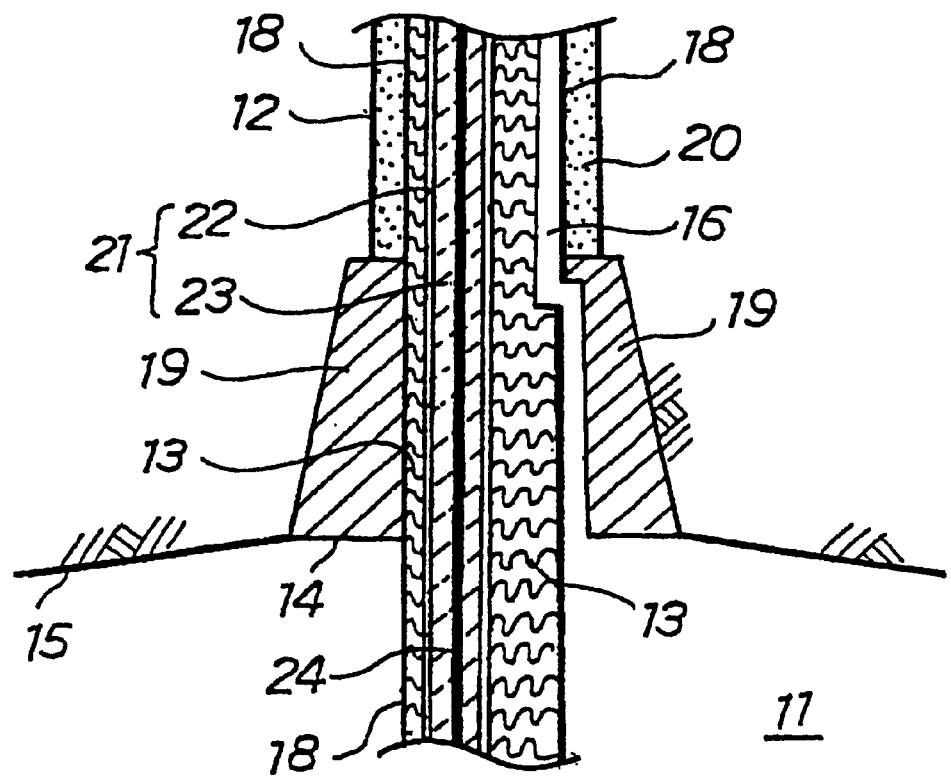
FIG. 4 is an enlarged view showing the area indicated by B of FIG. 1.

One preferred embodiment of the present invention will now be described in detail with reference to the accompanying drawings. A compressed gas storage tank 10 utilizing a rock-bed cavity according to this embodiment, as shown in FIGS. 1 to 4, includes a rock-bed cavity 11 formed as an underground cavity at a predetermined depth (for example, 600 m depth) in a soft rock ground and extending laterally by a considerable length (for example, 1000 m), so that an electric power storing compressed air (compressed gas) produced utilizing surplus electric power during night time can be stored therein.

Moreover, according to the compressed gas storage tank 10 of this embodiment, the compressed air is stored in the rock-bed cavity 11 in a state in which the compressed air is loaded from the underside thereof with a hydrostatic pressure of a heavy bentonite slurry 13 fed into the rock-bed cavity 11 through a vertical shaft 12. A light bentonite slurry 30 is fed and arranged in such a manner as to cover the upper side of the heavy bentonite slurry 13 fed into the compressed gas storage tank 10. Owing to difference in specific gravity between the heavy bentonite slurry 13 and a light bentonite slurry 30, the bentonite slurry in the compressed gas storage tank 10 is of a dual structure consisting of an upper layer composed of the light bentonite slurry 30 and a lower layer composed of the heavy bentonite slurry 13.

Moreover, according to the compressed gas storage tank 10 of this embodiment, the rock-bed cavity 11 is constructed such that its ceiling part 15 exhibits a rising gradient toward its top part 14 which is a connecting portion with the vertical shaft 12 and a compressed gas pipe 16 for feeding a compressed air to the rock-bed cavity 11 is open downward from the top part 14.

The rock-bed cavity 11 is an underground cavity having a generally circular section which has a diameter of about 10 to 15 m. The cavity 11 is formed by excavating the rock-bed laterally so as to have a length of about 500 m on both left and right sides from the lower end portion of the vertical shaft 12 by means of various kinds of known rock-bed tunnel excavating method. The rock-bed cavity 11 is generally horizontally formed and its diameter becomes smaller towards the outside from its part located below the vertical shaft 12. Owing to this feature, its ceiling part 15 exhibits a gentle rising gradient towards its top part 14 where a lower end part of the compressed gas pipe 16 is open. A liquid pool portion 17 in the shape of a recess is formed, by enlarged excavation operation, in a central bottom area of the rock-bed cavity 11 located below the top part 14. A lower end of a mud feed pipe 18, which is pipe-arranged along the vertical shaft 12 and allowed to extend across the rock-bed cavity 11 so as to dent downward, is arranged to be open to the liquid pool portion 17.

The vertical shaft 12 is a vertical hole having a circular section which has a diameter of about 6 m, formed by digging the underground formation from the ground surface vertically downward prior to the excavation operation of the rock-bed cavity 11, using various kinds of known vertical hole excavating methods. A mud feed pipe 18 extends through the vertical shaft 12. By supplying the heavy bentonite slurry 13 into the mud feed pipe 18, it can be fed into the rock-bed cavity 11 through the vertical shaft 12.

The mud feed pipe 18 is a steel pipe having a circular section which has a diameter of about 2 m. The mud feed pipe 18 is inserted into the vertical shaft in such a manner as to sequentially join a component pipe element to an upper end of the preceding pipe element and to insert such pipe elements assembly downward from the ground surface. A lower end of the mud feed pipe 18 is disposed in the liquid pool portion 17. A grout material 20 is supplied between an external side of the mud feed pipe 18 disposed within the vertical shaft 12 and an inner wall surface of the vertical shaft 12 in such a manner as to fill a gap therebetween and hardened. By doing so, the inner surface of the vertical shaft 12 is protected, and the mud feed pipe 18 is firmly fixed within the vertical shaft 12 (see FIG. 3). A concrete-made blocking plug 19 is formed at a connecting portion between a lower end part of the vertical shaft 12 and the rock-bed cavity 11 in such a manner as to cover the periphery of the mud feed pipe 18 (see FIG. 4). By virtue of a provision of the blocking plug 19, the compressed air and the light bentonite slurry 30 accumulated in the rock-bed cavity 11 are prevented from leaking upward through the gap between the inner wall surface of the vertical shaft 12 and the mud feed pipe 18. A lower end face of the blocking plug 19 constitutes the top part 14 which occupies the highest position of the ceiling part 15.

The compressed gas pipe 16 for feeding a compressed air into the rock-bed cavity 11 and a reverse osmosis membrane water-generating pipe 21 are disposed along the mud feed pipe 18. The compressed gas pipe 16 is a pipe made of FRP (fiber reinforced plastics) having a diameter of about 100 mm. One end of the compressed gas pipe 16 is connected to a compressor disposed at an electric power generating facility 26 as later described, and the other end is once allowed to project outward of the mud feed pipe 18 at a lower end part of the mud feed pipe 18 and then embedded in the blocking plug 19 with a distal end opening thereof being open downward from the lower end face of the blocking plug 19 which is the top part 14 of the rock-bed cavity 11.

The reverse osmosis membrane water-generating pipe 21 is constituted by installing a reverse osmosis membrane module 23 taught by Japanese Patent Application Laid-Open No. 10-156356 to a lower end part of a protective pipe 22 composed of a steel pipe having a circular section which has a diameter of about 1 m. In reverse osmosis membrane water-generating pipe 21, a salt water composed of, for example, sea water, is supplied to the inside of the protective pipe 22, and a fresh water collected into a production water vessel via a fresh water collection pipe of the reverse osmosis membrane module 23 is lifted up by a lifting pump through a lifting pipe 24. By doing so, fresh water is produced. According to this reverse osmosis membrane water-generating pipe 21, if water in the fresh water collection pipe is lifted up, a pressure difference equal to or larger than the reverse osmosis pressure caused by the salt water in the protective pipe 22 is normally generated in a natural condition between the internal pressure thereof and that of the fresh water collection pipe due to hydrostatic pressure applied to an outer periphery of the reverse osmosis membrane module 23 and therefore, a pressure difference necessary for reverse osmosis can easily be obtained. This makes it possible to produce fresh water economically and efficiently. According to this embodiment, a lower end part of the protective pipe 22 of the reverse osmosis membrane water-generating pipe 21 projects downward beyond a lower end of the mud feed pipe 18 and its distal end is supportingly embedded in a bottom part of the liquid pool portion 17. Accordingly, the reverse osmosis membrane water-generating pipe 21 is installed along the mud feed pipe 18 in a stable manner.

Moreover, according to this embodiment, a heavy bentonite slurry storage reservoir 25 for storing the heavy bentonite slurry 13 to be fed to the rock-bed cavity 11 is formed on the ground surface adjacent to the vertical shaft 12. This heavy bentonite slurry storage reservoir 25 has an electric power generating facility 26 equipped with the compressor generating the compressed air, turbine generator, etc. The electric power generating facility 26 is disposed on the reservoir 25 in a floating state. The upper end opening of the mud feed pipe 18 is connected with the heavy bentonite slurry storage reservoir 25.

According to the compressed gas storage tank 10 of this embodiment, prior to operation of the tank 10, the work for air-tightening the rock-bed cavity 11 is carried out by blocking the void and the crack formed in the inner wall surface of the rock-bed cavity 11. That is to say, after water is fed into the rock-bed cavity 11 to clean it, the heavy bentonite slurry 13 having a specific gravity of 1.20 to 2.0 is fed through the mud feed pipe 18 so as to fill the rock-bed cavity 11 and the mud feed pipe 18. Then, the light bentonite slurry 30 having a specific gravity of 1.05 to 1.20 is forcibly fed into the rock-bed cavity, in which the heavy bentonite slurry 13 has been filled, through the compressed gas pipe 16 in such a manner as to push out the heavy bentonite slurry.

The heavy bentonite slurry 13 is a suspension liquid obtained by mixing a muddy water with high specific gravity fine powder such as barite and hematite as a load adjusting material in such a stable condition that it may hardly precipitate. The heavy bentonite slurry is a comparatively expensive muddy water having a specific gravity of about 1.2 to 2.0. Specifically, a bentonite slurry having a weight mix of Table 1, for example, can be used as the heavy bentonite slurry 13.

TABLE 1

| Composition of heavy bentonite slurry | | | | | |
|---|---|---|---|---|---|
| Specific gravity/material | 2.0 | 1.8 | 1.6 | 1.4 | 1.2 |
| Base material fresh water (ml) | 100 | 100 | 100 | 100 | 100 |
| Viscosity improver bentonite (g) | 8.5 | 8.2 | 8.0 | 8.0 | 8.0 |
| Viscosity improver driscal (g) | 0.20 | 0.20 | 0.20 | 0.15 | 0.10 |
| Dispersant SSMA (g) | 0.50 | 0.45 | 0.20 | 0.10 | 0.05 |
| Load adjusting material barite (g) | 183.3 | 136.3 | 89.2 | 56.3 | 22.8 |
| Alkari agent slaked lime (g) | 0.10 | 0.16 | 0.16 | 0.10 | 0.10 |
| Antiseptic agent HCHO (g) | 0.05 | 0.05 | 0.05 | 0.05 | 0.05 |

TABLE 1-continued

| Composition of heavy bentonite slurry | | | | | |
|---|---|---|---|---|---|
| Evaporation inhibitor liquid paraffin | little | little | little | little | little |
| Total capacity (ml) | 145 | 135 | 125 | 115 | 107 |

The light bentonite slurry 30 is a muddy water having a specific gravity of 1.05 to 1.20 obtained, for example, by adding powder of calcium carbonate having an average grain diameter of about 10 to 40 microns as a filler while slightly increasing the quantity of bentonite as a viscosity improver which is to be blended with a bentonite slurry. This light bentonite slurry 30 is inexpensive compared with the heavy bentonite slurry 13. The light bentonite slurry 30 is mixed with, for example, a lost circulation inhibitor (LCM) as a filling-up material serving as a core at the time of forming a mud cake for blocking the void and the crack formed in the rock-bed. Owing to presence of the filler and the filling-up material, the mud cake is surely and firmly retained in the void and the crack formed in the rock-bed. Specifically, a bentonite slurry having a weight mix of Table 2, for example, can be used as the light bentonite slurry 30. As the lost circulation inhibitor, there can be used plants such as cottons, walnut shells, pulp processed products and the like, minerals such as pulverized substances of vermiculites, mica pieces, chrysotiles and the like, or synthetic products such as cut articles of film, mixtures of cellophane and the like. Particularly, in order to rapidly fill up the void and the crack formed in the ceiling part 15 of the rock-bed cavity 11 where leakage of the compressed gas tends to occur, it is preferable to use a material, such as a light weight aggregate which can be floated and suspended at an upper part in the bentonite slurry.

TABLE 2

| Composition of light bentonite slurry | |
|---|---|
| Specific gravity/material | 1.15 to 1.10 |
| Base material fresh water (ml) | 100 |
| Viscosity improver bentonite (g) | 10.0 |
| Filler calcium carbonate powder (g) | 8.0 |
| Dispersant SSMA (g) | 0.05 |
| Load adjusting material (g) | — |
| Alkari agent (g) | — |
| Antiseptic agent HCHO (g) | 0.05 |
| Evaporation inhibitor liquid paraffin | little |
| Total capacity (ml) | 107 |

By filling the heavy bentonite slurry 13 and the light bentonite slurry 30 in the rock-bed cavity 11 in this way, a mud cake is formed on the inner wall surface of the rock-bed cavity 11 and the void and the crack of the rock-bed are blocked with the mud cake. Thus, the rock-bed cavity 11 is air-tightened. According to this embodiment, since the bentonite slurry filled in the rock-bed cavity 11 has a dual layer structure consisting of the heavy bentonite slurry 13 and the light bentonite slurry 30 and the light bentonite slurry 30 mixed with the filling-up material is closely contacted in a pressurized condition with the ceiling part 15 of the rock-bed cavity 11 where the compressed gas tends to easily leak outside, a mud cake is firmly and surely formed by the light bentonite slurry 30 and therefore, the void and the crack formed in the ceiling part 15 can surely be blocked with the mud cake.

Moreover, according to this embodiment, the rock-bed cavity 11 serves its connecting portion with the vertical shaft 12 as the top part 14, towards which the ceiling part 15 of the rock-bed cavity 11 exhibits a rising gradient, and the compressed gas pipe 16 is open downward from the top part 14. Accordingly, during the air-tightening operation of the rock-bed cavity 11, the void and the crack formed in the ceiling part 15 where the stored compressed air tends to easily leak outside can be also surely blocked by completely filling the light bentonite slurry 30 and the heavy bentonite slurry 13 into the rock-bed cavity 11, while allowing air to completely escape from the rock-bed cavity 11 without remainder. Thus, a firm air-tightening performance can be given to the rock-bed cavity 11.

Furthermore, according to the compressed gas storage tank 10 of this embodiment, after the rock-bed cavity 11 is air-tightened by the heavy bentonite slurry 13 and the light bentonite slurry 30, the compressed gas storage tank 10 is operated. That is to say, compressed air is produced by the compressor within the electric power generating facility 26 utilizing surplus electric power at night time, for example. And the compressed air thus produced is forcibly fed into the rock-bed cavity 11 through the compressed gas pipe 16. The forcibly fed compress air is stored in the compressed gas storage tank in a state in which it is loaded with a hydrostatic pressure load from its underside by the heavy bentonite slurry 13, while pushing down the heavy bentonite slurry 13 and the light bentonite slurry 30 in the rock-bed cavity 11 by the pressure. The pushed-down heavy bentonite slurry 13 is sequentially flowed into the mud feed pipe 18 the lower end opening of which is open to the liquid pool portion 17, as the capacity of the compressed air is increased in the rock-bed cavity 11. And the heavy bentonite slurry 13 is then moved to the heavy bentonite slurry storage reservoir 25 through the mud feed pipe 18 in such a manner as to be pushed up (see FIG. 1).

Since the lower end opening of the mud feed pipe 18 is opened to the liquid pool portion 17 formed in the shape of a recess at a location even lower than bottom part of the rock-bed cavity 11, the lower end opening of the mud feed pipe 18 is kept inserted into the heavy bentonite slurry 13 and the light bentonite slurry 30 remained in the liquid pool portion 17 so that the compressed air is prohibited from flowing therein, even if the compressed air is stored so far as to the bottom part of the rock-bed cavity 11. Accordingly, the compressed air can be efficiently stored in large capacity as far as to the bottom part of the rock-bed cavity 11.

On the other hand, in day time, for example, when a large quantity of electric power is required, the stored compressed air is taken out of the rock-bed cavity 11 into the electric power generating facility 26 through the compressed gas pipe 16, and fuel and air are admixed so as to be combusted under high pressure, thereby causing the turbine of the turbine generator to rotate so as to generate an electric power. As the capacity of the compressed air is reduced due to taking-out of the compressed air, the heavy bentonite slurry 13 moved from the heavy bentonite slurry storage reservoir 25 is supplemented in the rock-bed cavity 11 and the compressed air is still kept pushed from its underside by the hydrostatic pressure of the heavy bentonite slurry 13. In a state in which the compressed air is completely discharged from the rock-bed cavity 11, the heavy bentonite slurry 13 is filled in the rock-bed cavity 11 again in the presence of the upper layer composed of the light bentonite slurry 30 at the ceiling part.

In this way, the storage and taking-out of the compressed air are repeatedly carried out by operation of the compressed gas storage tank 10. In association with this repeating procedure, an air-tight state caused by filling of the compressed air and a liquid-tight state caused by filling of the bentonite slurry appear repeatedly in an upper half portion of the rock-bed cavity 11. Due to repetition of the air-tight state and the liquid-tight state (metasomatism of liquid-tightness and air-tightness), the mud cake grows and is consolidated and hardened to allow self-recovery.

According to this embodiment, since the light bentonite slurry 30 mixed with the filling-up material is closely contacted with the ceiling part 15 of the rock-bed cavity 11 where the compressed gas tends to easily leak outside, a firm and stable mud cake is self-recovered by the light bentonite slurry 30, thus making it possible to more surely block the void and the crack formed in the ceiling part 15. Moreover, since the ceiling part 15 of the rock-bed cavity 11 exhibits a rising gradient towards the top part 14 and the compressed gas pipe 16 is open downward from the top part 14, the ceiling part 15 where the stored compressed gas tends to easily escape outside can surely be self-recovered by surely creating a liquid-tight state up to the ceiling part 15 and the top part 14 of the rock-bed cavity 11 while allowing the compressed gas to escape completely from the rock-bed cavity through the compressed gas pipe 16.

That is to say, according to the compressed gas storage tank 10 of this embodiment, a sufficient air-tightness can be obtained by surely blocking the ceiling part 15 of the rock-bed cavity 11, and the self-recovering operation, which is carried out while repeating the liquid-tight state and the air-tight state, can surely be performed at the ceiling part 15 of the rock-bed cavity 11. Therefore, and the compressed gas can surely be stored in a stable manner without allowing it to escape.

Moreover, since the reverse osmosis membrane water-generating pipe 21 arranged at the interior of the mud feed pipe 18 is juxtaposed to the vertical shaft 12, economic efficiency can be obtained by effectively utilizing the vertical shaft 12 which is formed by excavating the underground deep to the rock-bed cavity 11.

Furthermore, since the bentonite slurry to be filled into the rock-bed cavity 11 has a dual layer structure consisting of the heavy bentonite slurry 13 and the light bentonite slurry 30, and the quantity of use of the expensive heavy bentonite slurry 13 can be reduced by a portion equal to the quantity of use of the light bentonite slurry 30, economic efficiency can be obtained.

Moreover, since the supplement made at the time of reduction of the bentonite slurry is carried out utilizing the inexpensive light bentonite slurry 30 which is fed through the compressed gas pipe 16, the maintenance management of the compressed gas tank 10 can be performed economically.

It should be noted that the present invention is not limited to the above-mentioned embodiment and many changes can be made. For example, the rock-bed cavity 11 is not necessarily obtained by forming an underground cavity by means of tunnel excavation. Instead, a abandoned mine and a natural cavity can be used directly as the rock-bed cavity 11 only by giving some correction, where necessary. Similarly, the vertical shaft is not limited to the juxtaposition to the reverse osmosis membrane water-generating pipe. Instead, a hot water storage pipe, an ice heat accumulation pipe, a deep aerating pipe, a sludge digestive pipe, a sewage complete aerating pipe and the like may be juxtaposed. Moreover, other compressed gas than the compressed air can be stored.

Figure 5:
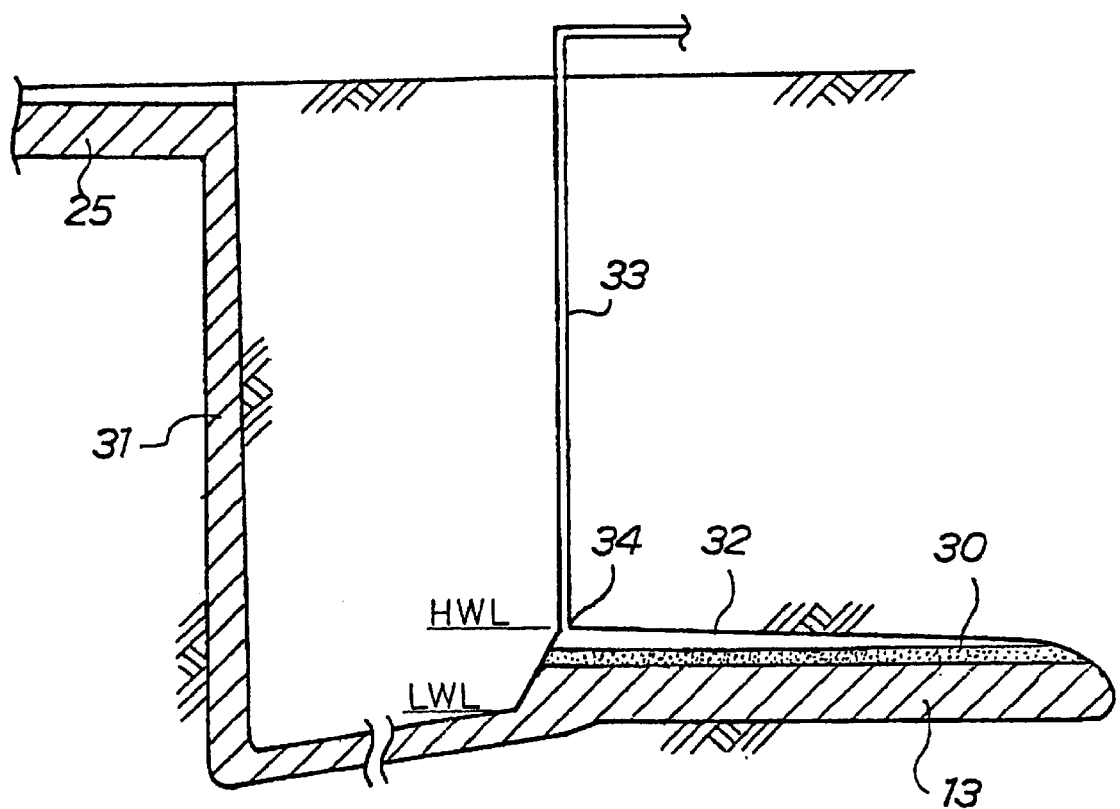
FIG. 5 is a schematic sectional view showing a compressed gas storage tank according to another embodiment of the present invention.

It is not absolutely necessary that the compressed gas pipe opening downward from the top part of the rock-bed cavity is arranged within the vertical shaft and its lower end is open at the connecting portion between the vertical shaft and the rock-bed cavity. For example, as shown in FIG. 5, it is also accepted that a compressed gas pipe 33 is disposed towards the top part 34 of the rock-bed cavity 32 separately from the mud feed pipe 31 for feeding the heavy bentonite slurry 13 and the compressed gas pipe 33 is open downward from the top part 34.

INDUSTRIAL APPLICABILITY

According to a compressed gas storage tank utilizing a rock-bed cavity of the present invention, a sufficient air-tightness can be obtained by surely blocking the ceiling part of the rock-bed cavity, and the self-recovering operation, which is carried out while repeating the liquid-tight state and the air-tight state, can surely be performed at the ceiling part of the rock-bed cavity. Therefore, the compressed gas can surely be stored in a stable manner without allowing it to escape.

What is claimed is:

1. A compressed gas storage tank utilizing a rock-bed cavity in which a bentonite slurry is fed into an underground cavity formed in a rock-bed, and a compressed gas forcibly fed to said underground cavity through a compressed gas pipe is stored in said rock-bed cavity in a state in which the compressed gas is loaded with a pressure load of the bentonite slurry from the underside of the compressed gas,
wherein said compressed gas pipe is open downward from a top portion of said rock-bed cavity, and said bentonite slurry in said rock-bed cavity is of a dual layer structure consisting of an upper layer composed of a light bentonite slurry mixed with a filling-up material invading into and filling up a void and a crack formed in an inner wall surface of the rock-bed cavity and having a specific gravity of 1.05 to 1.20, and a lower layer composed of a heavy bentonite slurry mixed with a high specific gravity fine powder as a load condition material and having a specific gravity of 1.20 to 2.0.

2. The compressed gas storage tank utilizing a rock-bed cavity according to claim 1, wherein said light bentonite slurry is forcibly fed through said compressed gas pipe into said rock-bed cavity in which the heavy bentonite slurry is filled.

3. The compressed gas storage tank utilizing a rock-bed cavity according to claim 1, wherein said rock-bed cavity is an underground cavity extending laterally with a ceiling part thereof exhibiting a rising gradient toward said top portion which is a connecting portion with said compressed gas pipe.

4. The compressed gas storage tank utilizing a rock-bed cavity according claim 1, wherein the heavy bentonite slurry is fed into said rock-bed cavity through a vertical shaft formed in the underground and said vertical shaft has associated facilities such as a reverse osmosis membrane water-generating pipe and a deep aeration pipe juxtaposed thereto.

* * * * *